Patented July 23, 1946

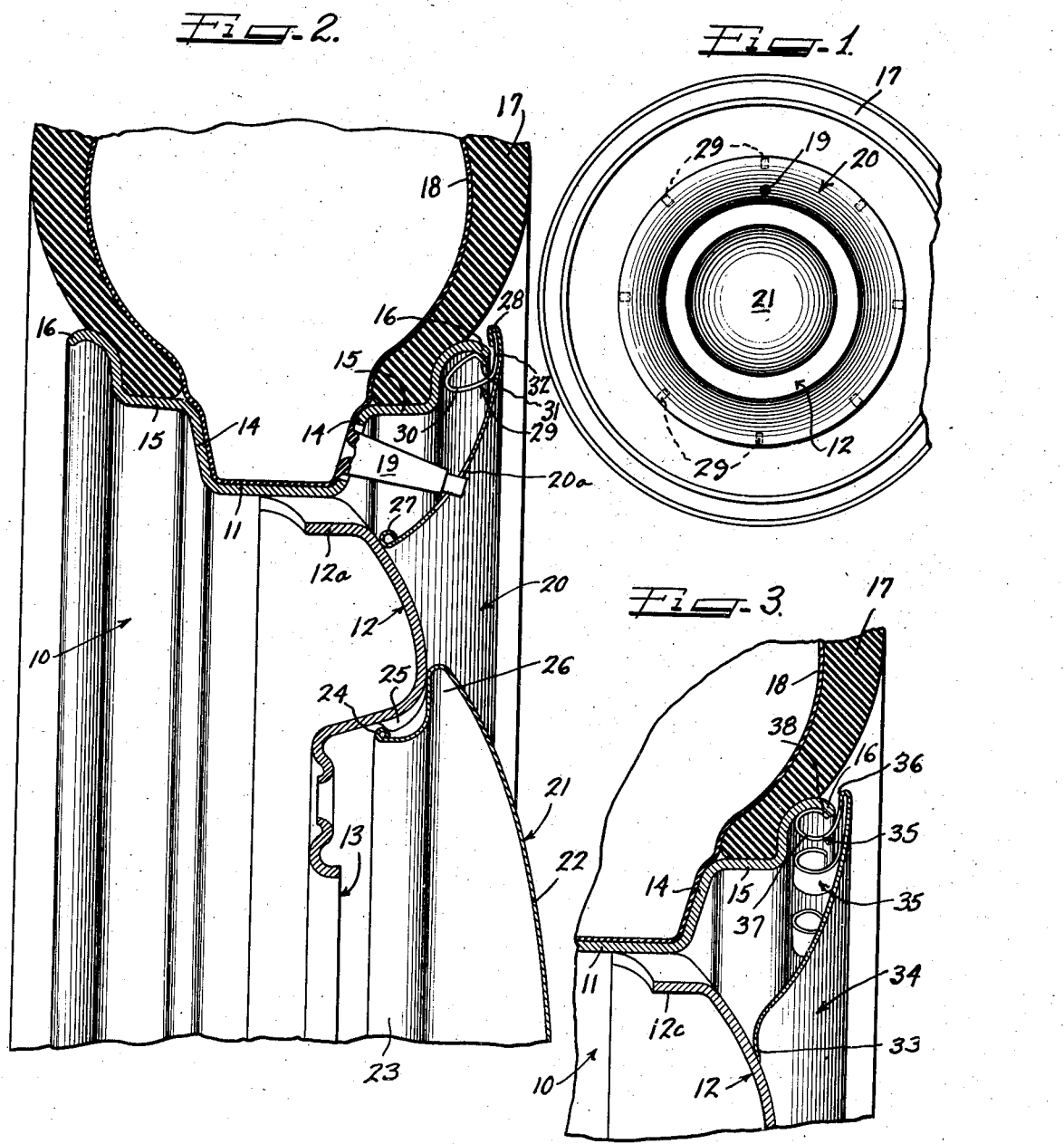

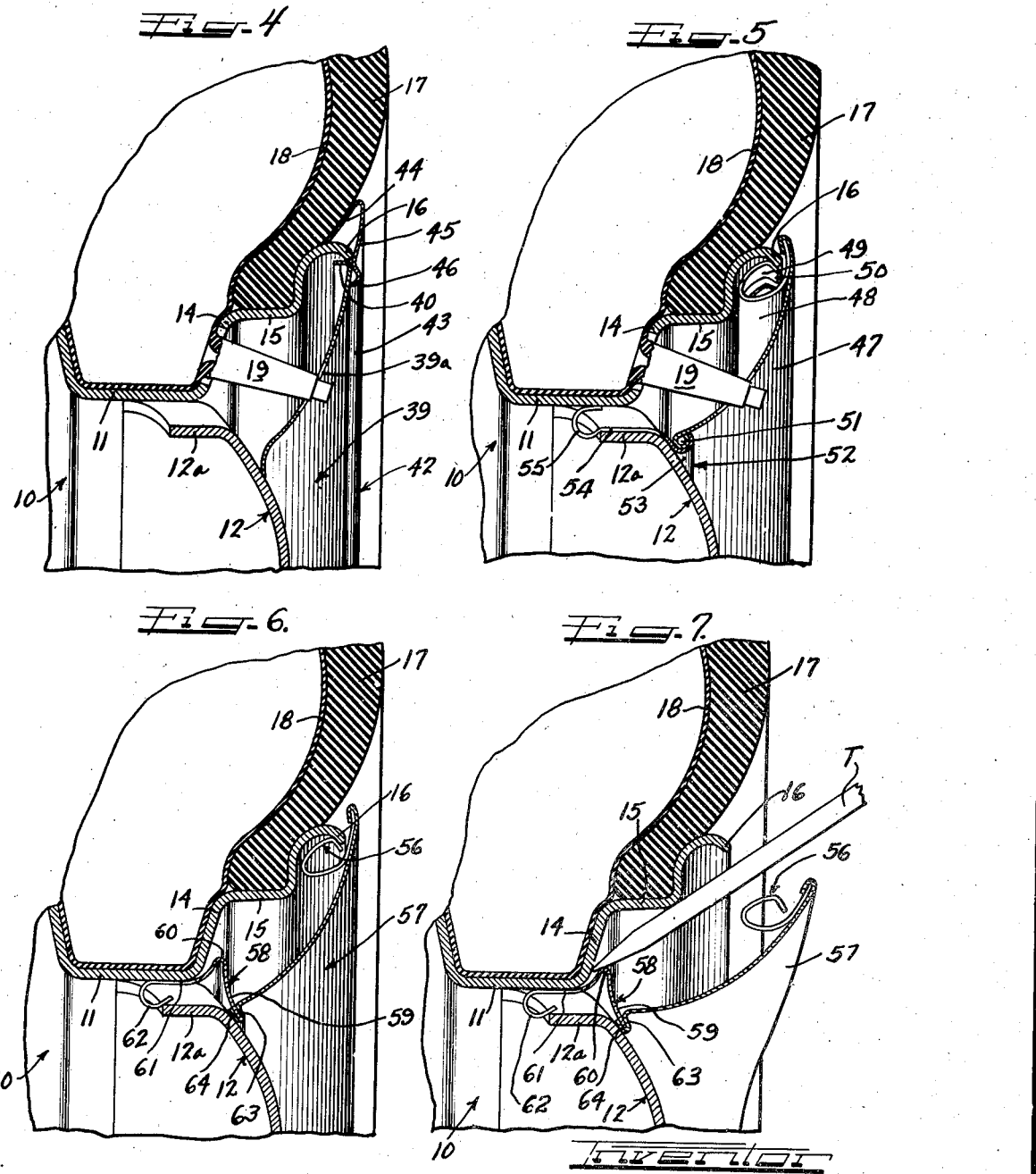

2,404,389

UNITED STATES PATENT OFFICE 2,404,389

WHEEL STRUCTURE

George Albert Lyon, Allenhurst, N. J.

Application June 2, 1943, Serial No. 489,309

6 Claims. (Cl. 301—37)

This invention relates to a wheel structure and is directed more particularly to an improved cover assembly therefor.

One of the important objects of the invention is to provide for a wheel structure a cover assembly including improved retaining means for securing the same to the wheel.

Still another object of the invention is to provide for a cover assembly on a wheel structure, improved retaining means of the type characterized as "easy-on, hard-off" in that the cover may be quickly and easily applied to the wheel structure and, when once applied, can be removed therefrom only by the application of forces considerably greater than those previously used to attach the same.

Still another object of the invention is to provide for a wheel structure a cover assembly including an outer part constructed from sheet synthetic plastic stock or the like, whereby it possesses locally resiliently, temporarily flexible characteristics enabling it to be flexed locally outwardly away from the associated wheel structure to render the rear side thereof accessible, this cover assembly being secured to the wheel structure by improved means at the outer periphery thereof, said means being so arranged that the outer peripheral portion of the flexible cover is protected from breakage impressed by the pry-off or removal forces necessarily applied to obtain detachment of the cover from the wheel.

Still a further object of the invention is to provide improved means for detachably securing the outer peripheral part of a locally, temporarily flexible cover member to a wheel structure.

In accordance with the general features of the invention, there is provided herein, for a wheel structure, a cover assembly arranged for disposition over the outer side thereof, said cover assembly including a self-sustaining, form retaining radially outer marginal portion formed to be locally, temporarily flexed away from the wheel to render the rear side thereof accessible and having a cross-sectional configuration of such shape and magnitude that it constitutes, in effect, a continuation of the side wall of a tire mounted on the wheel structure to give the effect of being a part thereof and to give the appearance of being a white side wall of a massive tire mounted upon a wheel structure of minimum dimensions, when colored white.

Other objects and advantages of the invention will become apparent from the following description and accompanying drawings in which:

Figure 1 is a fragmentary side elevation of a wheel structure embodying a preferred form of my invention;

Figure 2 is a fragmentary cross-sectional view of a wheel structure showing the form of my invention disclosed in Figure 1;

Figure 3 is a fragmentary cross-sectional view of a wheel structure embodying still another form of my invention;

Figures 4 and 5 are fragmentary cross-sectional views of a wheel structure embodying still further modified forms of my invention;

Figure 6 is a fragmentary cross-sectional view showing a wheel structure embodying another form of my invention; and Figure 7 is a fragmentary cross-sectional view of the construction shown in Figure 6 but showing the manner in which a pry-off tool may be applied to the cover for effecting removal thereof from the wheel structure.

It will be understood that the embodiments disclosed herein are for illustrative purposes and may be changed or modified without departing from the spirit and scope of the invention as set forth in the appended claims.

Referring to Figure 1, the wheel structure shown herein includes a tire rim 10 having a base flange 11 to which is secured a central spider or load bearing portion 12 as by riveting or welding a peripheral flange 12a thereof to the base flange 11 of the tire rim.

As will be seen from Figure 2, the flange 12a, at certain parts thereof, is depressed radially inwardly of the wheel structure to afford circumferentially spaced apertures along the junction of the tire rim with the central load bearing portion 12. The tire rim is further provided with opposite side flanges 14, opposite intermediate flanges 15 and opposite edge portions 16 between which is disposed a pneumatic tire 17 having an inner tube 18 provided with a valve stem 19 which projects through a suitable registering aperture in the outer side wall flange 14 of the tire rim.

The cover assembly shown in the construction of Figure 2 includes an outer annular cover part 20 and a central hub cap simulating circular cover part 21. The central circular cover part is provided with a crown portion 22 and an axially inwardly extending snap-on flange 23 terminating in a snap-on bead 24, the latter being arranged to be forced resiliently inwardly at portions thereof which override substantially radially inwardly extending humps 25 formed on the outer surface of the central load bearing portion 12 when the hub cap simulating member 21 is urged axially inwardly of the wheel structure until the extreme radially outer portion 26 of the hub cap member comes to rest against the adjacent portion of the outer surface of the spider 12. When the hub cap portion is forced into the above position it will be seen that the snap-on bead 24 has sprung resiliently outwardly to come to rest upon an obliquely disposed, substantially radially inwardly, axially outwardly extending rear face of the humps 25, whereby a secure detachable engagement is obtained.

The outer annular cover part 20 is preferably provided with a cross-sectional configuration of such size and magnitude that it extends radially outwardly to the edge portion 16 of the tire rim and, if desired, therebeyond and radially inwardly with a gradual curvature similar to that of the side wall of the tire 17 to a point preferably radially inwardly of the radially innermost extremity of the tire rim 10, thereby to constitute, in effect, a continuation of the side wall of the tire and to give the appearance of being a part thereof and to appear as a white side wall of a massive tire mounted upon a wheel structure of minimum dimension, when colored white.

In view of the fact that in certain vehicle constructions wheel balancing weights, and the like, are ordinarily appended to the tire rim and in view of the fact that the cover member 21, as above described, substantially entirely conceals the outer side of the tire rim, some expedient must be provided for rendering the rear side of the rim accessible. Furthermore, while the valve stem 19 shown herein is of a length sufficient to extend through the aperture 20a in the cover part 20, certain constructions are utilized wherein the valve stem is entirely concealed by the cover part and, under said circumstances, it is likewise necessary that the rear side of the cover be accessible for servicing of these parts housed therebehind. To this end the cover member 20 is preferably constructed from a material such as synthetic plastic sheet stock or the like, having locally resilient, elastically flexible, self-sustaining characteristics whereby the cover may be temporarily, locally distorted to render the rear side thereof accessible by drawing a part thereof away from the wheel structure with which it is associated.

The cover member 20 is preferably provided at the inner peripheral margin thereof with a rolled portion forming a circular reinforcing bead 27, the radially outer periphery thereof being turned back as at 28 to encompass one end of a plurality of circumferentially spaced resilient clips 29 having loop portions 30 terminating in obliquely disposed, substantially radially inwardly, axially outwardly extending terminal portions 31. As will be seen from Figure 2, the intermediate loop parts of the members 29 provide resiliency for the terminal portions 31 which may be sprung into engagement behind the radially inwardly, axially outwardly extending peripheral margin of the edge portion 16 of the tire rim 10.

In attaching the cover member 20 to the wheel structure, it will be seen that axial inward movement thereof will cause the looped portions of the members 29 to engage against the edge portion 16 and to be urged radially inwardly relative thereto until the terminal portions 31 thereof have moved sufficiently far axially inwardly to permit them to come to rest against the radially inner surface of the edge portion 16 as shown in Figure 2. This axial inward movement of the cover member and the resultant radial inward resilient movement of the looped portions of the members 29 may be accomplished with ease and facility; however, withdrawal of the cover member and the members 29 from the wheel structure requires a considerably greater force since the outer surfaces of the terminal portions 31 are, in effect, drawn against the radially inner surface of the edge portion 16 during the withdrawal movement and are detached from the edge portion by axial outward movement of the cover only after sufficient force has been applied to resiliently spring the entire looped portions 30 radially inwardly to so position the terminal portions 31 that they may be slidingly disengaged from the edge portion 16.

As indicated previously, the cover 20 is preferably formed from a material which is relatively weaker than metal or the like, and accordingly it is highly desirable that the radially outer peripheral margin of the cover member be protected against damage by a pry-off tool, this protection being afforded herein by the novel construction shown which includes a shank portion 32 on each of the resilient retaining members 29, these shank portions serving to reinforce the peripheral margin of the cover member, particularly in the vicinity of the remainder of the clips, at which point the pry-off pressure is applied either manually or by a tool.

From the foregoing it will be seen that there is provided herein an improved cover assembly and improved retaining means therefor whereby the cover may be applied to the wheel by means of an "easy-on" operation and may be removed therefrom only by a "hard-off" operation, and furthermore that the margin of the cover member against which the pry-off operation is applied is protected against breakage.

In the cover construction shown in Figure 3, the radially inner portion 33 of the cover 34 is merely curved to converge with the curvature of the adjacent portion of the spider or body part 12 of the wheel structure.

In this construction the retaining means for securing the cover to the wheel structure includes integral, resilient finger members 35 which comprise projections or extensions from a turned back portion 36 formed at the radially outer peripheral margin of the cover 34.

The members 35, like those shown at 29 in Figure 2, are looped as at 37 and are provided with terminal portions 38 which resiliently fit in the substantially radially inwardly curled part of the edge portion 16 of the tire rim 10. These integral members 35 cooperate with the wheel structure in the easy-on, hard-off manner previously described in connection with the construction of Figure 2, and accordingly, once secured to the wheel structure, they efficiently retain the cover 34 thereon in the desired manner. Furthermore, since the retaining members 35 are formed from the same material as is the cover 34, they efficiently secure the cover to the wheel structure and yet may be detached therefrom with the application of a degree of axial outward force applied to the radially outer part of the cover which is insufficient to damage that portion of the cover which is manipulated to effect removal thereof from the wheel.

The construction of Figure 4 includes a cover member 39 similar to that shown in Figure 3 except for the outer peripheral margin thereof which, in this construction, is formed to provide a substantially axially inwardly extending flange 40. In this form of my invention the cross-sectional curvature of the cover member 39 is such that when the radially outer part thereof is urged into alignment with the axially outer extremity of the edge portion 16 of the tire rim 10, the radially inner portion thereof is retained in pressure engagement against the outer surface of the central load bearing portion 12 of the wheel structure as shown at 41, the body thereof being provided with an orifice 39a arranged to receive the outer, protruding end of the tire valve stem 19.

In order that the outer peripheral portion of the cover 39 may be retained in the aforementioned position and to further augment the ornamental effect of the cover assembly there is provided herein a split ring member 42, the ends of which meet as at 43, this split ring serving as a retaining member for the cover and being readily attachable to and removable from the wheel structure in a manner to be presently described.

The retaining member 42 is provided with a cross-sectional configuration including a rear flange 44 which may be disposed in abutting relationship with the portion of the outer side wall of the tire 17 immediately radially outwardly of the junction thereof with the edge portion 16 of the tire rim 10. The member 42 is further provided with a radially inwardly extending portion 45 terminating in a beaded reinforcing part 46, the latter part extending radially inwardly beyond the edge portion 16 to engage the outer surface of the radially outer margin of the cover member 39 to retain the same in the position shown in Figure 4. The retaining member 42 may be formed from any suitable material but preferably this member is constructed from sheet metal and may be finished with a high luster or enameled to give the desired color effect.

In assembling the construction of Figure 4, it will be seen that it is merely necessary to dispose the cover 39 in concentric relationship over the outer side of the wheel and then to progressively engage the annular retaining member 42 around the tire rim in the position shown in Figure 4, whereby it urges the outer peripheral part of the cover 39 axially inwardly into the position shown to retain the same securely on the wheel structure.

In the construction shown in Figure 5, the cover 47 is similar to that shown in the construction of Figure 2; however, in this instance, the retaining means associated with the outer peripheral part thereof, is in the form of an annulus 48 having finger elements 49, these elements terminating in substantially radially inwardly, axially outwardly extending obliquely disposed terminal portions 50 which function in a manner similar to the portions 31 of the construction shown in Figure 2. In the construction of Figure 5, it will be seen that the retaining member, being provided with a continuous annular portion, serves to greatly strengthen the cover member and flexure of a portion of the outer peripheral margin of the latter results in a greater circumferential expanse thereof being removed away from the wheel in order to render the rear side of the cover accessible. In this construction, in order that the cover will not be entirely removed from the wheel structure when a portion of the outer peripheral part thereof is drawn axially outwardly from the wheel, there is provided at the inner peripheral part thereof a bead 51 which is pivotally engaged in an annular retaining element 52, the annular portion of which is provided with an outwardly curled cross-sectional configuration to provide an outwardly opening grooved part 53 for receiving the bead 51. The retaining member 52 is further provided with a plurality of circumferentially spaced, axially inwardly extending arms 54 which are arranged for alignment with the depressed portions of the flange 12a and thus with the circumferentially spaced apertures at the junction of the tire rim 10 and the central load bearing portion 12 of the wheel structure. The arms 54 terminate in resilient loops 55 which are configurated to give an overall dimension greater than that of the depth of the respective aperture in the wheel structure. Thus, when the retaining member 52 is urged axially inwardly of the wheel structure with the arms 54 and the loops 55 in alignment with the spaced apertures of the wheel, the loops 55 are compressed until they attain a position shown in Figure 5, whereupon they expand to lock the retaining member 52 on the wheel structure. It will be understood that the cover member 47 may be first assembled with the retaining member 52 or the cover may be elastically snapped into the radially outwardly grooved, annular portion 53 after the member 52 has been assembled in the position shown in Figure 5. Thereafter the outer peripheral portion of the cover 47 may be pressed against the wheel structure whereupon the fingers 49, and particularly the ends thereof, will be radially inwardly deflected and then will expand radially outwardly to attain the interlocking position shown.

In the form of my invention shown in Figures 6 and 7, the resilient, circumferentially spaced members 56 are similar to those shown in the construction of Figure 2. However, in this instance, the retaining means at the radially inner periphery of the locally flexible cover member 57, while similar to that shown at 52, in Figure 5, differs therefrom principally in that it is constructed to facilitate removal of the assembly from the wheel structure.

As shown in Figures 6 and 7, the retaining means 58 provided at the radially inner periphery of the cover member 57, includes an annular portion 59 which terminates in a radially outwardly extending peak 60.

The retaining means 58 is further provided with a plurality of circumferentially spaced, axially inwardly extending arms 61 which terminate in resilient loops 62, the latter having an overall dimension greater than the depth of the spaced apertures in the wheel structure and being arranged for alignment therewith so that axial inward movement of the cover assembly causes compression of the loops 62 as they pass through the respective apertures, whereupon they expand to interlock the cover assembly with the wheel structure when the extreme inward axial position, such as that shown in Figure 6, is attained. As will be seen from the drawings, the cover member 57 may be provided at the radially inner margin thereof with a substantially radially inwardly turned flange 63 which terminates in an oppositely extending flange 64, the radially inner peripheral part of the annular portion 59 of the retaining member 58 being disposed in sandwiched relationship between the flanges 63 and 64 to afford attached engagement of the retaining member and the cover 57.

As shown in Figure 7, after the members 56 have been disengaged from the wheel structure, the cover 57 may be drawn axially outwardly away from the edge portion 16 to permit entry of a pry-off tool T, the point of which may be inserted axially inwardly of the peak 60 of the retaining member 58 with an intermediate part thereof fulcrumed at the corner junction formed between the edge portion 16 and the intermediate flange 15 of the tire rim 10. It will be seen that when the tool is in this position, upward movement of the outer part thereof will cause radial inward movement of the point thereof and this movement will urge the peak 60, together with the loops 62, radially outwardly from the wheel to disengage the cover assembly therefrom.

From the foregoing it will be seen that I have provided herein a novel cover construction including improved retaining means whereby the cover may be attached to a wheel structure having a flanged tire rim, the attachment operation being accomplished with great facility. Furthermore, it will be seen that I have provided a retaining structure whereby the cover is very securely retained upon the wheel structure and may be removed therefrom only by the application of considerably greater forces than those required to accomplish the assembling operation, the retaining construction being such that the portions of the cover member against which detachment forces are applied, in the event that the cover is constructed from a resilient, relatively weak material, are well protected against destruction by the application of these forces.

What I claim is:

1. In a wheel structure including a tire rim and a central load bearing portion, a cover assembly including a radially outer annular, locally resiliently flexible, self-sustaining, relatively frangible part for disposition over the outer side of an annular portion of the wheel structure, retaining means for securing the cover to the wheel structure including a plurality of circumferentially spaced resilient clip members arranged to flex with relative ease to afford attachment of the cover to the wheel structure and to resist with greater force removal of the cover member from the wheel structure by axial outward movement of the cover, said clips being joined together as an integral unit by an integral annulus arranged to be enveloped at least in part by the radially outer marginal portion of the cover and to reenforce that portion of the cover against breakage by receiving a pry-off tool during a pry-off operation.

2. In a wheel structure including a tire rim and a central load-bearing portion, said tire rim having a flanged edge portion, a cover assembly including a radially outer annular part arranged to extend radially outwardly to the edge portion of the tire rim and retaining means for securing the cover to the wheel structure including a split retaining ring having a part arranged to overlie the radially outer surface of the edge portion of the tire rim and a part bent back upon the first named part and extending radially inwardly of the edge portion of the tire rim to overlap the outer margin of the cover to engage the same to detachably secure the cover to the wheel.

3. In a wheel structure including a tire rim having an axially outwardly and radially inwardly turned extremity flange and a central load bearing portion, an annular cover structure dimensioned to extend from overlying relation to the extremity flange of the tire rim adjacent to the tire supported by the rim and in concealing relation to the tire rim toward the load bearing portion of the wheel, and resilient spring clip means carried by the outer margin of the cover and including connecting structure united to said margin and extending radially inwardly at the axially inner side of the margin past the tire rim extremity and retaining loop structure turned generally axially inwardly from said connecting structure and upon itself for retaining engagement within said extremity flange of the tire rim.

4. In a wheel structure including a tire rim having an axially outwardly and radially inwardly turned extremity flange and a central load bearing portion, an annular cover structure dimensioned to extend from overlying relation to the extremity flange of the tire rim adjacent to the tire supported by the rim and in concealing relation to the tire rim toward the load bearing portion of the wheel, and resilient spring clip means carried by the outer margin of the cover and including connecting structure united to said margin and extending radially inwardly at the axially inner side of the margin past the tire rim extremity and retaining loop structure turned generally axially inwardly from said connecting structure and upon itself for retaining engagement within said extremity flange of the tire rim, said cover being formed from a material having the physical property of being self-sustaining and yet being resiliently deflectable without permanent deformation and said retaining means being operable to hold the cover on the wheel uniformly about the entire circumference of the cover but permitting resilient deflection of the cover within certain limits.

5. In a wheel structure including a tire rim having an axially outwardly and radially inwardly turned extremity flange and a central load bearing portion, an annular cover structure dimensioned to extend from overlying relation to the extremity flange of the tire rim adjacent to the tire supported by the rim and in concealing relation to the tire rim toward the load bearing portion of the wheel, and resilient spring clip means carried by the outer margin of the cover and including connecting structure united to said margin and extending radially inwardly at the axially inner side of the margin past the tire rim extremity and retaining loop structure turned generally axially inwardly from said connecting structure and upon itself for retaining engagement within said extremity flange of the tire rim, the connecting structure of the clip means being in the form of shanks lying contiguous to the inner face of the cover margin and the cover having a securing flange turned back upon itself and engaging said shanks.

6. In a wheel structure including a tire rim having an axially outwardly and radially inwardly turned extremity flange and a central load bearing portion, an annular cover structure dimensioned to extend from overlying relation to the extremity flange of the tire rim adjacent to the tire supported by the rim and in concealing relation to the tire rim toward the load bearing portion of the wheel, and resilient spring clip means carried by the outer margin of the cover and including connecting structure united to said margin and extending radially inwardly at the axially inner side of the margin past the tire rim extremity and retaining loop structure turned generally axially inwardly from said connecting structure and upon itself for retaining engagement within said extremity flange of the tire rim, said connecting structure of the clip means being formed as an integral turned back portion of the cover margin.

GEORGE ALBERT LYON.